US012604806B2

(12) United States Patent
Fischer et al.

(10) Patent No.: US 12,604,806 B2
(45) Date of Patent: Apr. 21, 2026

(54) MAIZE HEADER FOR A FORAGE HARVESTER, AND FORAGE HARVESTER COMPRISING SUCH A MAIZE HEADER

(71) Applicant: CLAAS Saulgau GmbH, Bad Saulgau (DE)

(72) Inventors: Josef Fischer, Biberach (DE); Patrick Popp, Schemmerhofen (DE)

(73) Assignee: CLAAS Saulgau GmbH, Bad Saulgau (DE)

( * ) Notice: Subject to any disclaimer, the term of this patent is extended or adjusted under 35 U.S.C. 154(b) by 343 days.

(21) Appl. No.: 18/488,732

(22) Filed: Oct. 17, 2023

(65) Prior Publication Data

US 2024/0130284 A1    Apr. 25, 2024
US 2024/0224862 A9    Jul. 11, 2024

(30) Foreign Application Priority Data

Oct. 24, 2022    (DE) ......................... 102022128071.3

(51) Int. Cl.
A01D 43/08 (2006.01)
(52) U.S. Cl.
CPC ................................. A01D 43/081 (2013.01)
(58) Field of Classification Search
CPC ........................... A01D 43/081; A01D 43/082
See application file for complete search history.

(56) References Cited

U.S. PATENT DOCUMENTS

2016/0227706 A1*    8/2016  Fischer ..................... F16F 3/12

FOREIGN PATENT DOCUMENTS

| DE | 19856444 | A1 | | 6/2000 | |
|----|----------|----|---|--------|---|
| DE | 10303380 | A1 | | 8/2004 | |
| DE | 102004022534 | A1 | | 12/2005 | |
| DE | 202004021165 | U1 | * | 2/2007 | ............. A01D 45/02 |
| DE | 102007058312 | A1 | | 6/2009 | |
| DE | 102014013141 | A1 | | 3/2016 | |
| DE | 102015113479 | A1 | * | 2/2017 | ........... A01D 43/082 |

OTHER PUBLICATIONS

EPO translation for DE102015113479 (Year: 2015).*
EPO translation for DE202004021165 (Year: 2004).*
German Patent Office Search report; 8 pages; Jun. 13, 2023, plus translation.

* cited by examiner

*Primary Examiner* — Cathleen R Hutchins

(57) ABSTRACT

A maize header comprising multiple mowing and infeed units (units 10), the first lateral mowing and infeed units (units 10b) are laterally next to central mowing and infeed units (units 10a), second lateral mowing and infeed units (units 10c) are laterally next to the first units (10b), and units (10d) are laterally next to the second units (10c), wherein, to transfer the maize header (2) between the working and a transport position, the units (10) are pivotable relative to one another about horizontal pivot axes (16) so that each of the units (10b) is pivotable about a first pivot axis (16a), each of the units (10c) is pivotable about a second pivot axis (16b), and each of the units (10d) is pivotable about a third pivot axis (16c), wherein a pivot angle ($\alpha$1) about the axes (16a) is 164°±4°, a pivot angle ($\alpha$2) about the (16b) is 180°±4°, and a pivot angle ($\alpha$3) about the axes (16c) is 184°±4°.

10 Claims, 3 Drawing Sheets

MAIZE HEADER FOR A FORAGE HARVESTER, AND FORAGE HARVESTER COMPRISING SUCH A MAIZE HEADER

The invention relates to a maize header for a forage harvester according to the preamble of Claim 1. The invention also relates to a forage harvester comprising such a maize header.

In the case of harvesters, a distinction is fundamentally made between harvesters that thresh the crop, and harvesters that chop the crop. When a type of cereal, such as wheat, barley or oats, or rapeseed is intended to be harvested as crop, use is typically made of harvesters in the form of combine harvesters. By contrast, if maize, miscanthus or sorghum is intended to be harvested as crop, the harvesters used are typically forage harvesters.

A harvester which is in the form of a combine harvester and threshes a crop that is to be harvested has an attachment with multiple mowing members which harvest the crop by forming a scissors-like severing cut. By contrast, a harvester which is in the form of a forage harvester has an attachment which is in the form of a maize header and has multiple mowing members driven in revolution. The present invention here relates to a maize header of a harvester which is in the form of a forage harvester and chops, and accordingly does not thresh, the crop that is to be harvested.

DE 10 2004 022 534 A1 discloses a harvester which is in the form of a forage harvester and is intended for harvesting stalk crops, such as maize or the like. The harvester comprises a maize header, wherein the maize header comprises multiple mowing and infeed units with drum-like mowing and infeed members which are driven in revolution, can rotate substantially about a vertical axis of rotation and are intended for severing the crop in a substantially horizontal direction.

In DE 10 2004 022 534 A1, the mowing and infeed units of the maize header are pivotable in relation to one another in order to transfer the maize header between a working position and a transport position. In the working position, all the mowing and infeed units are arranged next to one another as seen transversely to the direction of travel or harvesting direction. In the transport position, the mowing and infeed units are arranged one above another in multiple planes.

DE 10 2014 013 141 A1 likewise discloses a further harvester which is in the form of a forage harvester and is intended for harvesting stalk crops, such as maize or the like. In the case of this harvester, when an attachment is being transferred from the working position to the transport position, portions of the attachment can be pivoted, or folded, about pivot axes in such a way that the portions of the attachment are arranged in four layers extending one above another.

There is a need for maize headers with increasingly great working widths. There is thus a need for maize headers which have a working width of up to 10.5 m or even up to 12 m. Such maize headers also must be transferable into a transport position which allows the maize header to be transported by road in a state coupled to the forage harvester.

Thus, in the transport position, the horizontal transport width of a maize header should be no more than approximately 3.3 m for transport by road. The stack height of the maize header in the transport position should also not be excessively high, in order that a driver can still see enough of the road during the transport by road. Maize headers with increasing working widths cause difficulties in providing such a transport position. There is a need for a maize header which can be transferred into a transport position that enables unrestricted transport by road even if the maize header has a large working width of, for example, up to 12 m.

Against this background, the present invention is based on the object of providing a novel maize header for a forage harvester, and a forage harvester comprising such a maize header. This object is achieved by a maize header for a forage harvester according to Claim 1.

The maize header comprises multiple mowing and infeed units each having multiple drum-like or chain-like mowing and infeed members which can be rotated about a vertical or approximately vertical axis of rotation, can be driven in revolution, and are intended for severing the crop in a substantially horizontal direction from a field that is to be cultivated. In the working position of the maize header, as seen transversely to the harvesting direction, first lateral mowing and infeed units are arranged laterally next to central mowing and infeed units, second lateral mowing and infeed units are arranged laterally next to the first lateral mowing and infeed units, and third lateral mowing and infeed units are arranged laterally next to the second lateral mowing and infeed units. To transfer the maize header between the working position and a transport position, the mowing and infeed units are pivotable relative to one another about horizontal or approximately horizontal pivot axes in such a way that each of the first lateral mowing and infeed units is pivotable about a first pivot axis relative to the respective adjoining central mowing and infeed unit, that each of the second lateral mowing and infeed units is pivotable about a second pivot axis relative to the respective adjoining first lateral mowing and infeed unit, and that each of the third lateral mowing and infeed units is pivotable about a third pivot axis relative to the respective adjoining second lateral mowing and infeed unit. When the maize header is being transferred between the working position and the transport position, a pivot angle about the first pivot axes is $164°\pm4°$, a pivot angle about the second pivot axes is $180°\pm4°$, and a pivot angle about the third pivot axes is $184°\pm4°$. Such a maize header can be transferred into a transport position that enables unrestricted transport by road even if the maize header has a large working width of, for example, up to 12 m.

Preferably, the pivot angle about the first pivot axes is $164°\pm2°$, preferably $164°\pm1°$, and/or the pivot angle about the second pivot axes is $180°\pm2°$, preferably $180°\pm1°$, and/or the pivot angle about the third pivot axes is $184°\pm2°$, preferably $184°\pm1°$. Such a maize header can also be transferred into a transport position that enables unrestricted transport by road.

Preferably, in the working position of the maize header, as seen transversely to the harvesting direction, a horizontal distance between the axis of rotation of each of the central mowing and infeed units and the respective first pivot axis is $695\pm25$ mm, in particular $695\pm15$ mm, and a horizontal distance between the axis of rotation of each of the first lateral mowing and infeed units and the respective second pivot axis is $745\pm25$ mm, in particular $745\pm15$ mm, and a horizontal distance between the axis of rotation of each of the second lateral mowing and infeed units and the respective third pivot axis is $640\pm25$ mm, in particular $640\pm15$ mm. Such a maize header can also be transferred into a transport position that enables unrestricted transport by road.

Preferably, as seen in the harvesting direction, feeding drums and turning drums that can be rotated about a vertical or approximately vertical axis are arranged behind the mowing and infeed units, in such a way that, in the working position of the maize header, as seen in the harvesting direction, a respective feeding drum is arranged behind the two central mowing and infeed units, and a respective first turning drum is arranged behind a transfer region between each of the central mowing and infeed units and the first lateral mowing and infeed unit that is arranged laterally directly next to it, and a second turning drum is arranged behind a transfer region between each of the first lateral mowing and infeed units and the second lateral mowing and infeed unit that is arranged laterally next to it, wherein, to transfer the maize header between the working position and the transport position, each of the first lateral mowing and infeed units together with one of the first turning drums is pivotable relative to the respective adjoining central mowing and infeed unit and each of the second lateral mowing and infeed units together with one of the second turning drums is pivotable relative to the respective adjoining first mowing and infeed unit. Such a maize header can be transferred into a transport position that enables unrestricted transport by road even if the maize header has a large working width of, for example, up to 12 m.

Preferably, a cone angle of a frustoconical envelope of the respective first turning drum is matched to the first pivot angle of the respective first lateral mowing and infeed unit in such a way that, in the transport position of the maize header, a laterally outer side or a laterally outer edge of the frustoconical envelope extends parallel or approximately parallel to a vertically extending straight line or plane that delimits a permissible transport width of the maize header on one side. A cone angle of a frustoconical envelope of the respective second turning drum is matched to the second pivot angle of the respective second lateral mowing and infeed unit in such a way that, in the transport position of the maize header, a laterally inner side or a laterally inner edge of the frustoconical envelope extends parallel or approximately parallel to a center line or center plane that extends centrally between the two straight lines or planes defining the permissible transport width of the maize header. Such a maize header can also be transferred into a transport position that enables unrestricted transport by road.

Preferably, each of the two first turning drums is assigned a stripping member which comprises multiple stripping guides and is pivotable together with the respective first turning drum relative to the respective adjoining central mowing and infeed unit. It is preferably provided that, in the transport position of the maize header, a section in which lie edges of the respective stripping member that are situated opposite stripping edges of the stripping guides does not intersect a respective vertically extending straight line or plane that laterally delimits the transport width. In particular, in the transport position of the maize header, the respective section extends parallel or approximately parallel to the respective vertically extending straight line or plane.

The forage harvester according to the invention as defined in claim 1.

Preferred developments of the invention can be gathered from the dependent claims and the following description. Exemplary embodiments of the invention are explained in more detail, without being limited thereto, on the basis of the drawing, in which:

Figures 1, 2:
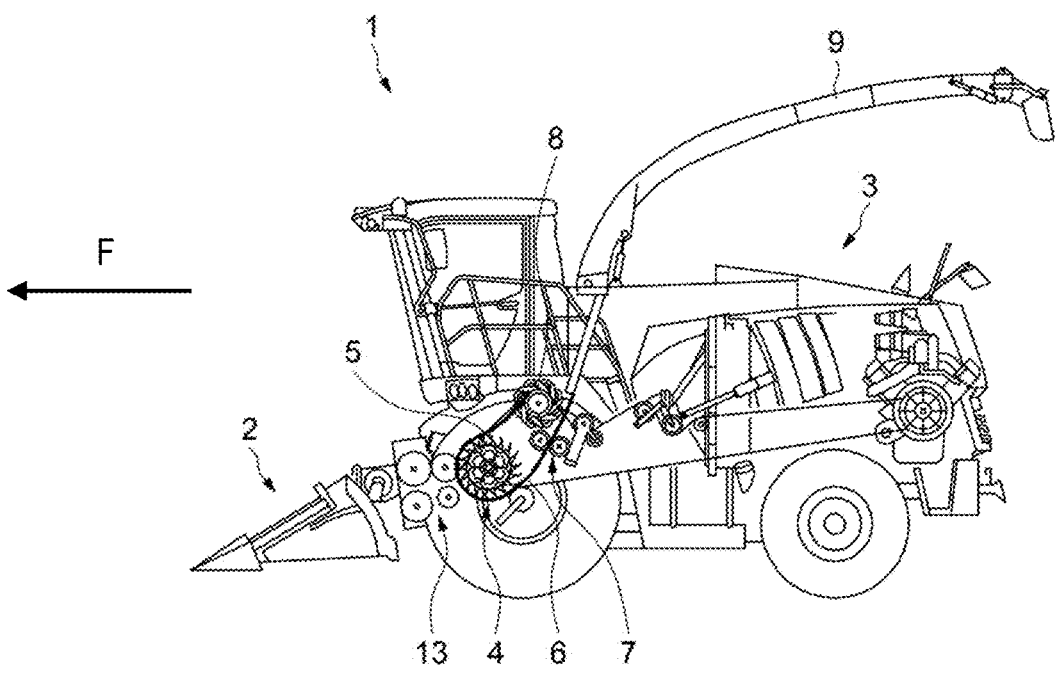
FIG. 1 shows a side view of a forage harvester comprising a maize header.
FIG. 2 shows a schematic view of assemblies of a maize header according to the invention in the transport position of the maize header, in a view counter to a direction of travel or harvesting direction of the forage harvester.

FIG. 1 shows a harvester in the form of a forage harvester 1. The forage harvester 1 comprises an attachment 2, which is coupled to a carrier vehicle 3 and is moved along by the carrier vehicle 3 in the direction of travel, which corresponds to the harvesting direction F, for harvesting work. The attachment 2 is what is referred to as a maize header for severing and taking up stalk crops, such as maize, miscanthus or sorghum.

The crop severed using the attachment 2 is moved inside the attachment through the attachment 2 and further processed by a chopping unit 4 of the forage harvester 1. The chopping unit 4 comprises a rotary chopping drum 5 and a drum base 6 arranged below the chopping drum 5.

Preferably, a conditioning device 7 is arranged downstream of the chopping unit 4 of the forage harvester 1 and a post-accelerator 8 is arranged downstream of the conditioning device 7. The conditioning device 7 is also referred to as grain cracker. The post-accelerator 8 serves in particular to introduce kinetic energy into the crop, in order to convey the crop through a discharge chute 9 with sufficient transporting speed.

The attachment 2, which is in the form of a maize header, of the forage harvester 1 has multiple mowing and infeed units 10, wherein each mowing and infeed unit 10 comprises multiple drum-like mowing and infeed members 11, which can be rotated about a vertical or approximately vertical axis of rotation 22 and are driven in revolution. This rotation of the mowing and infeed units 10 about a respective vertical or approximately vertical axis of rotation 22 takes place in the working position of the maize header 2. An approximately vertical axis of rotation 22 extends substantially in the vertical direction and may be inclined with respect to the vertical direction, for example by no more than 5° or 10°. The mowing and infeed members 11 of the maize header 2 that are driven in revolution serve to sever the crop in a substantially horizontal direction. The mowing and infeed members 11 of the maize header 2 are provided with conveying elements. It should be pointed out at this juncture that the mowing and infeed members 11, that are driven in revolution, of the mowing and infeed units 10 of the maize header 2 may be in the form of chain-like mowing and infeed members 11.

Feeding drums 12, which convey the crop toward an infeed unit 13 of the forage harvester 1, are positioned downstream of central mowing and infeed units 10a, each rotatable about an axis of rotation 22a, of the maize header 2 as seen in the harvesting direction F. The feeding drums 12 are arranged behind the central mowing and infeed units 10 in the harvesting direction F and can be rotated about a vertical or approximately vertical axis. An approximately vertical axis extends substantially in the vertical direction and may be inclined or slanted with respect to the vertical direction, for example by no more than 5° or 10°.

Figure 4:
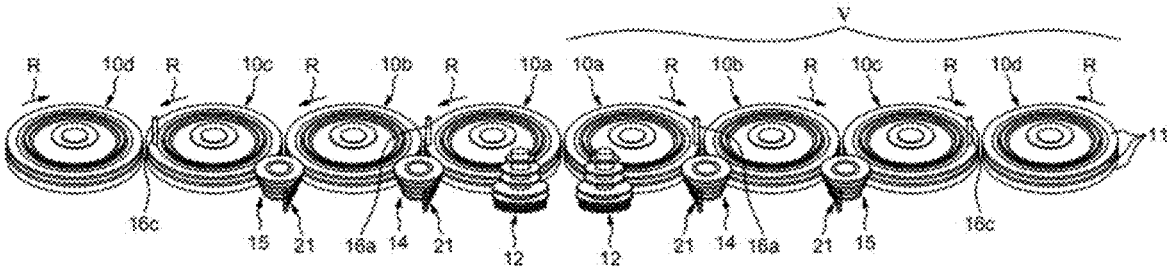
FIG. 4 shows a perspective plan view of assemblies of the maize header according to the invention in the working position of the maize header.

In the working position of the maize header 2, a first lateral mowing and infeed unit 10b, which is rotatable about an axis of rotation 22b, is arranged laterally next to a respective central mowing and infeed unit 10a, as can be seen best in FIG. 4. A respective first turning drum 14, which is rotatable about a vertical or approximately vertical axis, is arranged in a transfer region between each first lateral mowing and infeed unit $10b$ and the respective central mowing and infeed unit $10a$. An approximately vertical axis extends substantially in the vertical direction and may be inclined or slanted with respect to the vertical direction, for example by no more than 5° or 10°.

In the working position, a respective second lateral mowing and infeed unit $10c$, which is rotatable about an axis of rotation $22c$, adjoins the respective first lateral mowing and infeed unit $10b$ on the outside. A respective second turning drum $15$ is arranged in a transfer region between the respective second lateral mowing and infeed unit $10c$ and the respective adjoining first lateral mowing and infeed unit $10b$. The respective second turning drum $15$ is rotatable about a vertical or approximately vertical axis. An approximately vertical axis extends substantially in the vertical direction and may be inclined or slanted with respect to the vertical direction, for example by no more than 5° or 10°.

A third lateral mowing and infeed unit $10d$, which is rotatable about an axis of rotation $22d$, then adjoins the respective second lateral mowing and infeed unit $10c$ on the outside. No turning drum is arranged in the transfer region between the respective second lateral mowing and infeed unit $10c$ and the respective third lateral mowing and infeed unit $10d$ owing to the direction of rotation of the mowing and infeed members, visualized by the arrows R in FIG. 4.

It can be seen in FIG. 4 that the respective third lateral mowing and infeed unit $10d$ rotates about the axis of rotation $22d$ in the opposite direction to the direction in which the adjoining second lateral mowing and infeed unit $10c$ rotates about the axis of rotation $22c$. The respective second lateral mowing and infeed unit $10c$ rotates about the axis of rotation $22c$ in the same direction as the direction in which the adjoining first lateral mowing and infeed unit $10b$ and the respective adjoining central mowing and infeed unit $10a$ rotate about the axes of rotation $22b$, $22a$.

Figure 3:
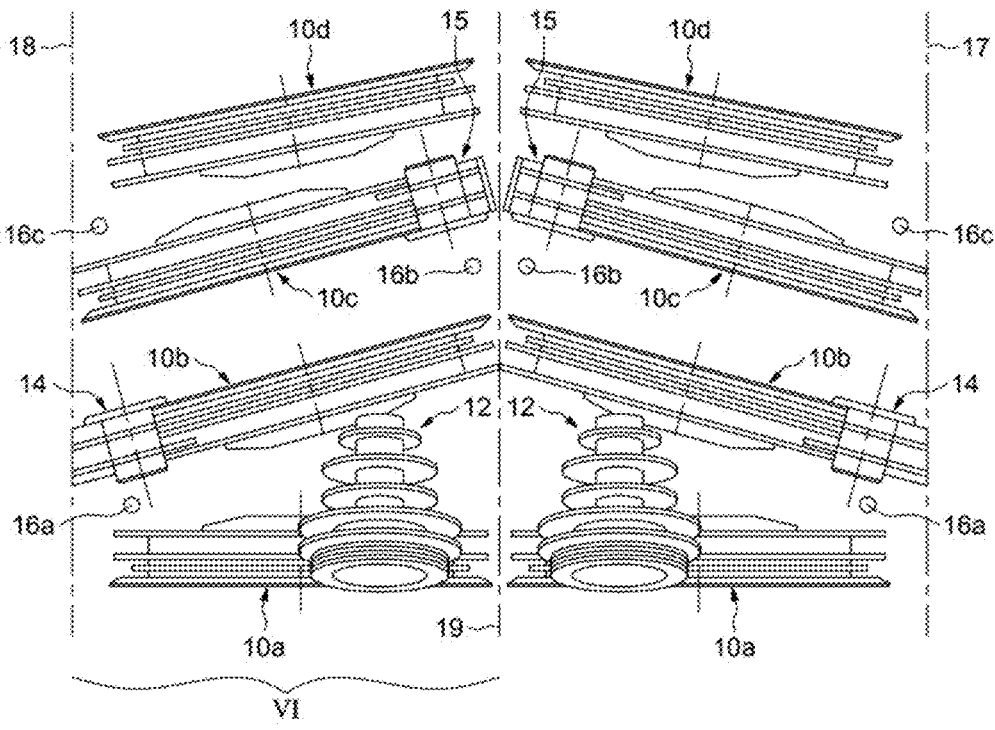
FIG. 3 shows a schematic view of assemblies of a maize header according to the invention in the transport position of the maize header, in a view in the direction of travel or harvesting direction of the forage harvester.
Figure 5:
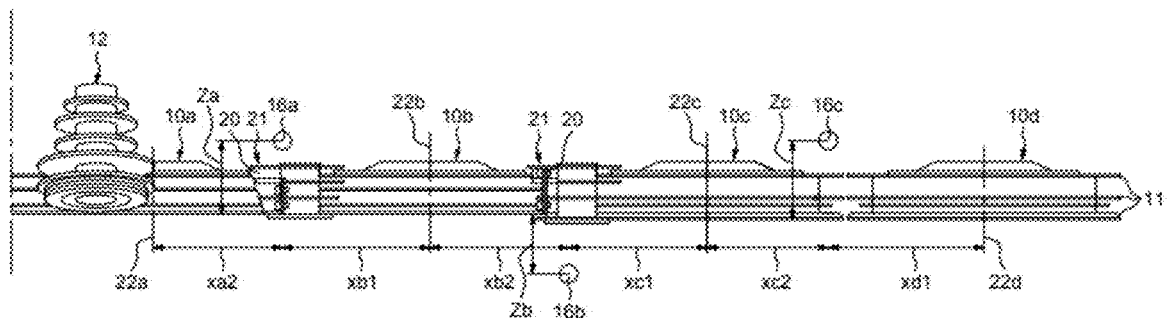
FIG. 5 shows the detail V in FIG. 4.
Figure 6:
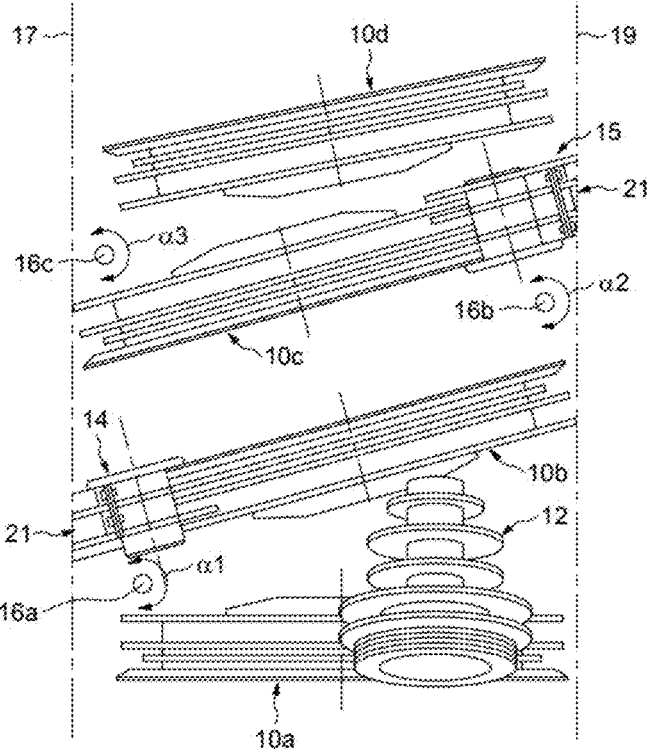
FIG. 6 shows the detail VI in FIG. 3.

The mowing and infeed units $10$ of the maize header $2$ can be displaced from the working position of FIG. 4 to the transport position of FIGS. 2 and 3. FIGS. 2, 3 and 5 schematically show pivot axes $16$ about which the mowing and infeed units $10$ can be displaced, that is to say pivoted or folded, relative to one another in the event of displacement between the working position and the transport position and vice versa, in the event of displacement between the transport position and the working position.

FIGS. 3 and 4 thus show that the respective first lateral mowing and infeed unit $10b$ is foldable or pivotable relative to the respective adjoining and fixed central mowing and infeed unit $10a$ about a pivot axis $16a$ extending in a horizontal or approximately horizontal direction.

The respective second lateral mowing and infeed unit $10c$ is pivotable or foldable relative to the adjacent respective first mowing and infeed unit $10b$ about a horizontal or approximately horizontal pivot axis $16b$.

Furthermore, the respective third lateral mowing and infeed unit $10d$ is also pivotable or foldable relative to the respective adjoining second lateral mowing and infeed unit $10c$ about a horizontally or approximately horizontally extending pivot axis $16c$.

An approximately horizontal pivot axis $16$ extends substantially in the horizontal direction and may be inclined or slanted with respect to the horizontal direction, for example by no more than 5° or 10°.

When the maize header $2$ is being transferred between the working position and the transport position, a pivot angle $\alpha1$ about the first pivot axes $16a$ of the maize header $2$ is 164°±4°, and a pivot angle $\alpha2$ about the second pivot axes $16b$ of the maize header $2$ is 180°±4°, and a pivot angle $\alpha3$ about the third pivot axes $16c$ of the maize header $2$ is 184°±4°.

Preferably, when the maize header $2$ is being transferred between the working position and the transport position, a pivot angle $\alpha1$ about the first pivot axes $16a$ is 164°±2°, and/or a pivot angle $\alpha2$ about the second pivot axes $16b$ is 180°±2°, and/or a pivot angle $\alpha3$ about the third pivot axes $16c$ is 184°±2°.

Particularly preferably, when the maize header $2$ is being transferred between the working position and the transport position, a pivot angle $\alpha1$ about the first pivot axes $16a$ is 164°±1°, and/or a pivot angle $\alpha2$ about the second pivot axes $16b$ is 180°±1°, and/or a pivot angle $\alpha3$ about the third pivot axes $16c$ is 184°±1°.

In the working position of the maize header $2$, as seen transversely to the harvesting direction, a horizontal distance xa2 between the axis of rotation $22a$ of each of the central mowing and infeed units $10a$ and the respective first pivot axis $16a$ is 695±25 mm, and a horizontal distance xb2 between the axis of rotation $22b$ of each of the first lateral mowing and infeed units $10b$ and the respective second pivot axis $16b$ is 745±25 mm, and a horizontal distance xc2 between the axis of rotation $22c$ of each of the second lateral mowing and infeed units $10c$ and the respective third pivot axis $16c$ is 640±25 mm.

Preferably, in the working position of the maize header $2$, the horizontal distance xa2 between the axis of rotation $22a$ of each of the central mowing and infeed units $10b$ and the respective first pivot axis $16a$ is 695±15 mm, and/or the horizontal distance xb2 between the axis of rotation $22b$ of each of the first lateral mowing and infeed units $10b$ and the respective second pivot axis $16b$ is 745±15 mm, and/or the horizontal distance xc2 between the axis of rotation $22c$ of each of the second lateral mowing and infeed units $10c$ and the respective third pivot axis $16c$ is 640±15 mm.

Particularly preferably, in the working position of the maize header $2$, the horizontal distance xa2 between the axis of rotation $22a$ of each of the central mowing and infeed units $10b$ and the respective first pivot axis $16a$ is 695±5 mm, and/or the horizontal distance xb2 between the axis of rotation $22b$ of each of the first lateral mowing and infeed units $10b$ and the respective second pivot axis $16b$ is 745±5 mm, and/or the horizontal distance xc2 between the axis of rotation $22c$ of each of the second lateral mowing and infeed units $10c$ and the respective third pivot axis $16c$ is 640±5 mm.

In the working position of the maize header $2$, as seen transversely to the harvesting direction, the first pivot axes $16a$ lie above the mowing and infeed units $10$ and a vertical distance za between them and a top side of the mowing members of the central mowing and infeed units $10a$ is 325±25 mm.

The second pivot axes $16b$ lie below the mowing and infeed units and a vertical distance zb between them and a top side of the mowing members of the first lateral mowing and infeed units $10b$ is 185±25 mm.

The third pivot axes $16c$ lie above the mowing and infeed units $10$ and a vertical distance zc between them and a top side of the mowing members of the second lateral mowing and infeed units $10c$ is 350±25 mm.

Preferably, in the working position of the maize header $2$, the vertical distance za of the first pivot axes $16a$ from the top side of the mowing members of the central mowing and infeed units $10a$ is 325±15 mm, and/or the vertical distance zb of the second pivot axes $16b$ from the top side of the mowing members of the first lateral mowing and infeed units 10b is 185±15 mm, and/or the vertical distance zc of the third pivot axes 16c from a top side of the mowing members of the second lateral mowing and infeed units 10c is 350±15 mm.

Particularly preferably, in the working position of the maize header 2, the vertical distance za of the first pivot axes 16a from the top side of the mowing members of the central mowing and infeed units 10a is 325±5 mm, and/or the vertical distance zb of the second pivot axes 16b from the top side of the mowing members of the first lateral mowing and infeed units 10b is 185±5 mm, and/or the vertical distance zc of the third pivot axes 16c from a top side of the mowing members of the second lateral mowing and infeed units 10c is 350±5 mm.

In the working position of the maize header 2, as seen transversely to the harvesting direction, a horizontal distance xb1 between the axis of rotation 22b of the respective first lateral mowing and infeed unit 10b and the respective first pivot axis 16a is 805±25 mm, and a horizontal distance xc1 between the axis of rotation 22c of the respective second lateral mowing and infeed units 10c and the respective second pivot axis 16b is 755±25 mm, and a horizontal distance xd1 between the axis of rotation 22d of each of the respective third lateral mowing and infeed units 10d and the respective third pivot axis 16c is 860±25 mm.

Preferably, in the working position of the maize header 2, the horizontal distance xb1 between the axis of rotation 22b of the respective second mowing and infeed units 10c and the respective first pivot axis 16a is 805±15 mm, and the horizontal distance xc1 between the axis of rotation 22c of the respective second lateral mowing and infeed units 10c and the respective second pivot axis 16b is 755±15 mm, and the horizontal distance xd1 between the axis of rotation 22d of each of the respective third lateral mowing and infeed units 10d and the respective third pivot axis 16c is 860±15 mm.

Particularly preferably, in the working position of the maize header 2, the horizontal distance xb1 between the axis of rotation 22b of the respective second mowing and infeed units 10c and the respective first pivot axis 16a is 805±5 mm, and the horizontal distance xc1 between the axis of rotation 22c of the respective second lateral mowing and infeed units 10c and the respective second pivot axis 16b is 755±5 mm, and the horizontal distance xd1 between the axis of rotation 22d of each of the third lateral mowing and infeed units 10d and the respective third pivot axis 16c is 860±5 mm.

The first turning drums 14 are pivotable or foldable together with the respective first lateral mowing and infeed units 10b and the second turning drums 15 are pivotable or foldable together with the respective second lateral mowing and infeed units 10c about the respective pivot axes 16, specifically when the maize header is being transferred between the working position and the transport position.

FIGS. 2 and 3 depict a dimension of the maize header 2 in vertically extending straight lines or planes 17, 18 in the transport position transversely to the harvesting direction F, wherein the distance between these planes or straight lines 17, 18 corresponds to the maximum permissible transport width of the maize header 2. It is preferably 3270 mm.

A vertical packing height of the maize header 2 in the transport position of the maize header is preferably 2483 mm.

A center line or center plane 19, which extends centrally between the two central mowing and infeed units 10a, is shown in the middle between these two straight lines or planes 17, 18.

A distance of the respective first pivot axis 16a from this center line or center plane 19 is 1445±25 mm, preferably 1445±15 mm, particularly preferably 1445±5 mm.

A distance between the respective first pivot axis 16a and the respective directly adjacent second pivot axis 16b is 1550±25 mm, preferably 1550±15 mm, particularly preferably 1550±5 mm.

A distance between the respective second pivot axis 16b and the respective directly adjacent third pivot axis 16c is 1550±25 mm, preferably 1395±15 mm, particularly preferably 1395±5 mm.

As already stated, the mowing and infeed units 10 are pivotable and thus foldable relative to one another about the pivot axes 16 for transferring the maize header 2 between the working position and the transport position.

Each of the first lateral mowing and infeed units 10b of the maize header 2 is pivotable and thus foldable together with its assigned first turning drum 14 relative to the respective adjoining central mowing and infeed unit 10a of the maize header 2, specifically in such a way that a frustoconical envelope of the respective first turning drum 14 and thus the respective first turning drum 14 is completely inside the permissible transport width, defined by the vertically extending straight lines or planes 17, 18 of the maize header 2 in the transport position of the maize header 2 shown in FIGS. 2 and 3.

The frustoconical envelope of the first turning drum 14 tapers from top to bottom in the working position of the maize header 2.

The feeding drums 12 of the maize header 2 also have a frustoconical envelope, although this envelope tapers from bottom to top and accordingly widens from top to bottom.

The second turning drums 15 of the maize header 2 also have a frustoconical contour, specifically in an orientation like the first turning drums 14, that is to say such that the envelope of the second turning drums 15 tapers from top to bottom and accordingly widens from bottom to top in the working position of the maize header 2.

As can be seen best in FIGS. 2 and 3, in the transport position of the maize header 2, a first one of the first turning drums 14 adjoins a first one of the two vertically extending straight lines or planes 17 and a second one of the first turning drums 14 adjoins a second one of the two vertically extending straight lines or planes 18, specifically in such a way that the frustoconical envelope of the respective first turning drum 14 does not intersect the respective vertically extending straight line or plane 17, 18. A cone angle of the frustoconical envelope of the respective first turning drum 14 is matched to the pivot angle α1 of the respective first lateral mowing and infeed unit 10b in such a way that, in the transport position of the maize header 2, a respective laterally outer side or a respective laterally outer edge of the respective frustoconical envelope of the respective first turning drum 14 extends parallel or approximately parallel to the respective vertically extending straight line or plane 17, 18.

To transfer the maize header 2 from the working position to the transport position, the two turning drums 15 together with the second lateral mowing and infeed units 10c are pivotable about the pivot axes 16b relative to the first lateral mowing and infeed units 10b. According to FIGS. 2 and 3, in the transport position of the maize header 2, the two second turning drums 15 are arranged on different sides of the vertically extending center line or center plane 19, wherein, in the transport position of the maize header 2, a first one of the second turning drums 15 adjoins the vertically extending center line or center plane 19 on a first side and a second one of the second turning drums 15 adjoins the vertically extending center line or center plane on a second side, in such a way that the frustoconical envelope of the respective second turning drum 15 does not intersect the center line or center plane 19. A cone angle of the frustoconical envelope of the respective second turning drum 15 is matched to the pivot angle α2 of the respective second outer mowing and infeed unit 10c in such a way that, in the transport position of the maize header 2, a laterally inner side or a laterally inner edge of the respective frustoconical envelope of the respective second turning drum 15 extends parallel or approximately parallel to the respective center line or center plane 19.

A stripping member 21 comprising multiple stripping guides 20 interacts with each of the two first turning drums 14. Such stripping members 21 are also assigned to the second turning drums 15. The stripping members 20 assigned to the turning drums 14, 15 are pivotable or foldable together with the respective turning drums 14, 15 when the maize header 2 is being transferred between the working position and the transport position. The stripping members 21 assigned to the first turning drums 14 are accordingly pivotable or foldable, together with the first turning drums 14 and the first lateral mowing and infeed units 10b, relative to the central mowing and infeed units 10a about the pivot axes 16a. The stripping members 21 assigned to the second turning drums 15 are pivotable or foldable, together with the second turning drums 15 and the second lateral mowing and infeed units 10c, relative to the first lateral mowing and infeed units 10b about the pivot axes 16b.

In the transport position of the maize header 2, the stripping guides 20 of the stripping members 21 assigned to the first turning drums 14, and thus these stripping members 21, together with the first turning drums 14 lie completely inside the transport width, defined by the vertically extending straight lines or planes 17, 18, of the maize header 2.

The stripping guides 20 have stripping edges and edges situated opposite the stripping edges, wherein a section in which lie those edges of the stripping guides 20 of the respective stripping member 21 that are situated opposite the stripping edges does not intersect the respective vertically extending straight line or plane 17, 18 in the transport position of the maize header 2. Rather, this section of the stripping members 21 assigned to the first turning drum 14, in which lie those edges of the stripping guides 20 that are situated opposite the stripping edges of the stripping guides 20, extends preferably parallel or approximately parallel to the respective vertically extending straight line or plane 17, 18, in particular congruently with that side of the frustoconical envelope of the respective first turning drum 14 that is the respective laterally outer one in the transport position of the maize header 2.

As already stated, such stripping members 21 are also assigned to the second turning drums 15 and are pivotable together with the respective second lateral mowing and infeed unit 10c relative to the respective adjoining first lateral mowing and infeed unit 10b. In the transport position of the maize header 2, in that case the stripping guides 20 of the stripping member 21 assigned to the first one of the second turning drums 15 lie on the first side and the stripping guides 20 of the stripping member 21 assigned to the second one of the second turning drums 15 lie on the second side of the center line or center plane 19. The respective section in which lie edges of the respective stripping member 21 that are situated opposite the stripping edges of the stripping guides 20 does not intersect the vertically extending center line or center plane 19, but extends preferably parallel to it, in particular congruently with the side that is the respective inner side in the transport position of the maize head or with the respective inner edge of the frustoconical envelope of the respective second turning drum 15.

The above embodiment of the maize header 2 makes it possible to enable a compact transport position which allows transport of the maize header 2 by road in a state coupled to the carrier vehicle 3, even in the case of a maize header having a working width of, for example, up to 12 m.

LIST OF REFERENCE SIGNS

1 Forage harvester
2 Attachment/Maize header
3 Carrier vehicle
4 Chopping unit
5 Chopping drum
6 Drum base
7 Conditioning device
8 Post-accelerator
9 Discharge chute
10 Mowing and infeed unit
10a Central mowing and infeed unit
10b First lateral mowing and infeed unit
10c Second lateral mowing and infeed unit
10d Third lateral mowing and infeed unit
11 Mowing and infeed member
12 Feeding drum
13 Infeed unit
14 Turning drum
15 Turning drum
16 Pivot axis
16a Pivot axis
16b Pivot axis
16c Pivot axis
17 Straight line/Plane
18 Straight line/Plane
19 Center line/Center plane
20 Stripping guide
21 Stripping member
22 Axis of rotation
22a Axis of rotation
22b Axis of rotation
22c Axis of rotation
22d Axis of rotation

The invention claimed is:

1. A maize header (2) for a forage harvester (1) for harvesting stalk crops,
   comprising multiple mowing and infeed units (10) each having multiple drum-like or chain-like mowing and infeed members (11) which can be rotated about a vertical or approximately vertical axis of rotation (22), can be driven in revolution, and are intended for severing the crop in a substantially horizontal direction from a field that is to be cultivated,
   wherein, in the working position of the maize header (2), as seen transversely to the harvesting direction, first lateral mowing and infeed units (10b) are arranged laterally next to central mowing and infeed units (10a), second lateral mowing and infeed units (10c) are arranged laterally next to the first lateral mowing and infeed units (10b), and third lateral mowing and infeed units (10d) are arranged laterally next to the second lateral mowing and infeed units (10c), wherein, to transfer the maize header (2) between the working position and a transport position, the multiple mowing and infeed units (10) are pivotable relative to one another about horizontal or approximately horizontal pivot axes (16) in such a way that each of the first lateral mowing and infeed units (10b) is pivotable about a first pivot axis (16a) relative to the respective adjoining central mowing and infeed unit (10a), that each of the second lateral mowing and infeed units (10c) is pivotable about a second pivot axis (16b) relative to the respective adjoining first lateral mowing and infeed unit (10b), and that each of the third lateral mowing and infeed units (10d) is pivotable about a third pivot axis (16c) relative to the respective adjoining second lateral mowing and infeed unit (10c), wherein, when the maize header (2) is being transferred between the working position and the transport position, a pivot angle ($\alpha$1) about the first pivot axes (16a) is 164°±4°, and a pivot angle ($\alpha$2) about the second pivot axes (16b) is 180°±4°, and a pivot angle ($\alpha$3) about the third pivot axes (16c) is 184°±4°; and wherein as seen in the harvesting direction, feeding drums (12) and turning drums (14, 15) that can be rotated about a vertical or approximately vertical axis are arranged behind the mowing and infeed units (10), in such a way that, in the working position of the maize header (2), as seen in the harvesting direction, a respective feeding drum (12) is arranged behind each of the two central mowing and infeed units (10a), a respective first turning drum (14) is arranged behind a transfer region between each of the central mowing and infeed units (10a) and the first lateral mowing and infeed unit (10b) that is arranged laterally directly next to it, a second turning drum (15) is arranged behind a transfer region between each of the first lateral mowing and infeed units (10b) and the second lateral mowing and infeed unit (10c) that is arranged laterally next to it, wherein, to transfer the maize header (2) between the working position and the transport position, each of the first lateral mowing and infeed units (10b) together with one of the first turning drums (14) is pivotable relative to the respective adjoining central mowing and infeed unit (10a) and each of the second lateral mowing and infeed units (10c) together with one of the second turning drums (15) is pivotable relative to the respective adjoining first mowing and infeed unit (10b)

a cone angle of a frustoconical envelope of the respective first turning drum (14) is matched to the first pivot angle ($\alpha$1) of the respective first lateral mowing and infeed unit (10b) in such a way that, in the transport position of the maize header (2), a laterally outer side or a laterally outer edge of the frustoconical envelope extends parallel or approximately parallel to a vertically extending straight line or plane (17, 18) that delimits a permissible transport width of the maize header (2) on one side, and a cone angle of a frustoconical envelope of the respective second turning drum (15) is matched to the second pivot angle ($\alpha$2) of the respective second lateral mowing and infeed unit (10c) in such a way that, in the transport position of the maize header (2), a laterally inner side or a laterally inner edge of the frustoconical envelope extends parallel or approximately parallel to a center line or center plane that extends centrally between the two straight lines or planes (17, 18) defining the permissible transport width of the maize header.

2. The maize header (2) according to claim 1, characterized in that, when the maize header (2) is being transferred between the working position and the transport position, the pivot angle ($\alpha$1) about the first pivot axes (16a) is 164°±2°, and/or the pivot angle ($\alpha$2) about the second pivot axes (16b) is 180°±2°, and/or the pivot angle ($\alpha$3) about the third pivot axes (16c) is 184°±2°.

3. The maize header (2) according to claim 1, characterized in that, when the maize header (2) is being transferred between the working position and the transport position, the pivot angle ($\alpha$1) about the first pivot axes (16a) is 164°±1°, and/or the pivot angle ($\alpha$2) about the second pivot axes (16b) is 180°±1°, and/or the pivot angle ($\alpha$3) about the third pivot axes (16c) is 184°±1°.

4. The maize header (2) according to claim 1, characterized in that, in the working position of the maize header (2), as seen transversely to the harvesting direction, a horizontal distance (xa2) between the axis of rotation (22a) of each of the central mowing and infeed units (10a) and the respective first pivot axis (16a) is 695±25 mm, and a horizontal distance (xb2) between the axis of rotation (22b) of each of the first lateral mowing and infeed units (10b) and the respective second pivot axis (16b) is 745±25 mm, and a horizontal distance (xc2) between the axis of rotation (22c) of each of the second lateral mowing and infeed units (10c) and the respective third pivot axis (16c) is 640±25 mm.

5. The maize header (2) according to claim 4, characterized in that, in the working position of the maize header (2), the horizontal distance (xa2) between the axis of rotation (22a) of each of the central mowing and infeed units (10a) and the respective first pivot axis (16a) is 695±15 mm, and/or the horizontal distance (xb2) between the axis of rotation (22b) of each of the first lateral mowing and infeed units (10b) and the respective second pivot axis (16b) is 745±15 mm, and/or the horizontal distance (xc2) between the axis of rotation (22c) of each of the second lateral mowing and infeed units (10c) and the respective third pivot axis (16c) is 640±15 mm.

6. The maize header (2) according to claim 4, characterized in that, in the working position of the maize header (2), the horizontal distance (xa2) between the axis of rotation (22a) of each of the central mowing and infeed units (10a) and the respective first pivot axis (16a) is 695±5 mm, and/or the horizontal distance (xb2) between the axis of rotation (22b) of each of the first lateral mowing and infeed units (10b) and the respective second pivot axis (16b) is 745±5 mm, and/or the horizontal distance (xc2) between the axis of rotation (22c) of each of the second lateral mowing and infeed units (10c) and the respective third pivot axis (16c) is 640±5 mm.

7. The maize header (2) according to claim 1, characterized in that, in the working position of the maize header (2), as seen transversely to the harvesting direction, the first pivot axes (16*a*) lie above the mowing and infeed units (10) and a vertical distance (za) between them and a top side of the mowing members of the central mowing and infeed units (10*a*) is 325±25 mm, and the second pivot axes (16*b*) lie below the mowing and infeed units (10) and a vertical distance (zb) between them and a top side of the mowing members of the first lateral mowing and infeed units (10*b*) is 185±25 mm, and the third pivot axes (16*c*) lie above the mowing and infeed units (10) and a vertical distance (zc) between them and a top side of the mowing members of the second lateral mowing and infeed units (10*c*) is 350±25 mm.

8. The maize header (2) according to claim 7, characterized in that, in the working position of the maize header (2), the vertical distance (za) of the first pivot axes (16*a*) from the top side of the mowing members of the central mowing and infeed units (10*a*) is 325±15 mm, and/or the vertical distance (zb) of the second pivot axes (16*b*) from the top side of the mowing members of the first lateral mowing and infeed units (10*b*) is 185±15 mm, and/or the vertical distance (zc) of the third pivot axes (16*c*) from a top side of the mowing members of the second lateral mowing and infeed units (10*c*) is 350±15 mm.

9. The maize header (2) according to claim 7, characterized in that, in the working position of the maize header (2), the vertical distance (za) of the first pivot axes (16*a*) from the top side of the mowing members of the central mowing and infeed units (10*a*) is 325±5 mm, and/or the vertical distance (zb) of the second pivot axes (16*b*) from the top side of the mowing members of the first lateral mowing and infeed units (10*b*) is 185±5 mm, and/or the vertical distance (zc) of the third pivot axes (16*c*) from a top side of the mowing members of the second lateral mowing and infeed units (10*c*) is 350±5 mm.

10. A forage harvester (1) comprising a maize header (2) according to claim 1.

* * * * *